United States Patent Office 3,393,051
Patented July 16, 1968

3,393,051
METHOD FOR DETERMINING SMALL CONCENTRATIONS OF SURFACE ACTIVE MATERIALS
John Kingsley Kerver, 70 Patti Lynn Lane, Houston, Tex. 77024
No Drawing. Filed Mar. 8, 1965, Ser. No. 438,089
12 Claims. (Cl. 23—230)

ABSTRACT OF THE DISCLOSURE

A quantitative technique for analyzing for small concentrations of surface active materials. The solution of surface active material, an adsorbent composed of particles on which the surface active material is adsorbed, two immiscible fluid phases such as oil and water, and a colorant are mixed in a glass vial. The surface active material which adsorbs on the adsorbent alters the surface wettability of the adsorbent, and portions of the adsorbent are preferentially attracted by either the water or oil phase. The relative amount of adsorbent attracted by each phase is a measure of the concentration of surface active material. Standard vials are prepared from known concentrations of the surface active material to facilitate quantatively determining the concentration of an unknown sample by comparison.

---

This invention concerns a method of testing. More particularly it concerns a quantitative analytical technique.

In the chemical laboratory, it is often desirable to analyze for and determine the concentration of a particular chemical in a solution. Numerous analytical techniques are available for accomplishing this purpose and are well known and described in the chemical literature. These tests are satisfactory in analyzing over specific concentration ranges or to a certain degree of accuracy; for instance, in a range of 1% to 99% or to an accuracy of plus or minus 0.1%. For some purposes it is desirable to analyze for a minute quantity of material dissolved in solution, for example, in the range of one part per billion to 100 parts per million. Most available analytical techniques are not sufficiently sensitive at these very low concentrations.

The present invention is a method for making quantitative analytical determinations in the range of one part per billion to 100 parts per million. Examples of chemicals which can be analyzed by the methods of this invention are nitrogen containing compounds such as:

primary, secondary, or tertiary monoamines;
diamines;
amides;
polyethoxylated amines, amides or diamines;
acetic, oleic, dimeric, napthenic or phosphate acid salts of the preceding materials;
imidazolines and derivatives;
quaternaries;
polysulfide derivatives of imidazoline;
resin derivatives;
pyrimidines;
mercaptans; and similar sulfur containing compounds;
and the like.

The foregoing compounds are commonly used as corrosion inhibitors for metals and examples of many are found in the patent literature. Other clases of compounds amenable to analysis include proteins, blood fractions, and body fluids. The foregoing are cited as examples of the type chemical amenable to analysis, and not as limitations.

The primary purpose of this invention is to provide an improved method for the quantitative determination of small concentrations of certain surface active materials. This and other objects of the invention will be apparent from a description of the invention as applied to the analysis for corrosion inhibitors. Corrosion inhibiting chemicals are used to prevent the corrosion of metal. These chemicals are effective in the concentration range of the order of 10 p.p.m. In order to utilize these inhibitors more efficiently and to obtain optimum protection, it is necessary to be able to accurately analyze for the inhibitor at the low concentrations at which they are effective. This is particularly important in the inhibitor squeeze technique for the mitigation of corrosion in oil well tubing.

The analytical method is a wetting phenomenon and depends on the examination of prepared adsorbent particles, silica for example, in a small glass vial. Silica, inhibitor solution, oil, water, and oil soluble colorant are added to a vial, shaken, and caused to settle and separate in a unique manner. The long-chain organic nitrogenous corrosion inhibitor is adsorbed on the surface of the silica particle and causes that portion of the silica particle covered with inhibitor to become preferentially oil-wet. The degree of oil wetness is measured by comparing the amount of settled white water-wet silica to the amount of colored oil-wet silica in the vial. Inhibitor concentrations are determined by comparing an unknown sample to that of standard solutions of known concentrations. With this technique differences of less than 1 p.p.m. of inhibitor can be distinguished in the range of 0 to 50 p.pm.

The operation of the present invention will become clearer from a description of steps followed in the actual practice of one embodiment of the invention. Analysis was for a tallow duomene naphthenic acid salt (corrosion inhibitor) dissolved in a purified kerosene-like hydrocarbon solvent.

(1) A silica sand adsorbent is prepared by placing 125 ml. of 140 to 270 mesh sand (American Graded Sand Co. No. 16) in a 500 ml. Squibb pear-shaped separatory funnel. Hot tap water is flowed in the bottom, and the water and impurities are permitted to overflow out the top. By adjusting the flow rate and holding the funnel at a small angle, the sand grains are fluidized and prevented from packing. Flow is continued for two hours; followed by rinsing with distilled water for five minutes. The washing removes clays, fine particles, and impurities. The sand is placed in a shallow porcelain dish, dried ,and fired at 800° C. in a muffle furnace for sixteen hours. After cooling, the sand surface is conditioned by exposure to a humid atmosphere. This conditioning is a critical step as described subsequently.

(2) A one-half saturated oil solution of a colorant not adsorbed by silica is prepared; for example, Dupont Oil Soluble Blue Dye "A" in purified kerosene.

(3) 0.8 ml. of the prepared silica sand adsorbent is placed in a 2 dram vial. This quantity of sand is a convenient volume.

(4) One ml. of the inhibitor in oil solution to be analyzed is added to the vial, and the vial is gently swirled to permit the oil to wet the sand grains and permit the inhibitor to adsorb on some or all of the sand surface. This renders the sand to a greater or lesser degree preferentially oil-wet.

(5) Four ml. of distilled inhibitor-free water is added to the vial to bring the fluid level up to about two-thirds full.

(6) Three drops of the blue dye solution are added to the vial which is then capped and shaken. The blue oil mixes with and becomes attached to the surface of any of the oil-wet sand. The vial is permitted to remain quiescent for thirty minutes.

(7) The vial is rotated and gently shaken to cause the sand to settle in layers. The oil-wet sand and its attached blue oil film will settle more slowly than the water-wet sand, so that with proper gentle shaking there will be a layer of white water-wet sand below a layer of blue oil-wet sand. The settling is most readily accomplished by holding the vial in a horizontal position and gently shaking in a horizontal plane at gradually decreasing intensities. The vial is then slowly and gradually raised to a vertical position while rapidly revolving the vial around its axis by twisting in a single direction.

(8) The following quantities are measured and compared to those obtained in a set of standards prepared from known concentrations of inhibitor.

(a) The ratio of the volume of oil-wet to water-wet sand.
(b) The amount of oil-wet and water-wet sand.
(c) The total height of all the settled sand.
(d) The volume of the supernatant free oil phase.

In the following Table I a set of standard vials are described.

TABLE I.—CONTENT OF STANDARD VIALS USED FOR INHIBITOR ANALYSIS

| Inhibitor Concentration, p.p.m. | Height or Thickness of Indicated Phase (millimeters) | | | |
|---|---|---|---|---|
| | White Water-wet Sand | Blue Oil-wet Sand and Oil | Total Settled Phase | Blue Supernatant Oil |
| 0 | 6.0 | 0 | 6 | 8.0 |
| 1 | 6.0 | Trace | 6 | 8.0 |
| 2 | 6.0 | 0.2 | 6 | 7.8 |
| 3 | 5.9 | 0.3 | 6 | 7.7 |
| 4 | 5.6 | 0.8 | 6.4 | 7 |
| 5 | 5.3 | 1.7 | 7 | 7 |
| 10 | 5 | 4 | 9 | 6 |
| 15 | 4.5 | 6.5 | 11 | 5 |
| 20 | 4 | 8 | 12 | 4 |
| 25 | 3 | 10 | 13 | 3 |
| 30 | 2 | 12 | 14 | 2 |
| 40 | 1 | 14 | 15 | Trace |
| 50 | 0 | 16 | 16 | 0 |

When no inhibitor is present the white water-wet sand settles to the bottom of the vial and is 6 mm. in height. The supernatant oil floats on top of the water and is 8 mm. in height. There is no blue oil-wet sand. When 10 p.p.m. of inhibitor is present the height of the water-wet sand layer is 5 mm., the height of the supernatant oil layer is 6 mm. and, in addition, there is a layer of blue oil-wet sand and oil 4 mm. in height suspended upon the white water-wet sand layer.

Examination of the prepared set of standards shows that with increasing inhibitor concentrations: (1) the height of the white water-wets and layer settled at the bottom of the vial decreases, (2) the height of the blue oil-wet sand layer increases, (3) the height of the floating supernatant oil layer decreases, and (4) the total height of the settled sand layers increases. Any one of these heights may be measured to determine inhibitor concentration. The preferred method is to compare a vial of which the inhibitor concentration is unknown to a set of standard vials taking all measurements into consideration.

For this embodiment of the invention, the sand preparation and conditioning step number 1 is important and critical to the process. Natural sand must undergo treatment to remove contaminants adsorbed on the surface. The firing to burn off the contaminants also removes adsorbed water and hydroxyl (OH−) groups attached to the silica surface. A portion of the water and/or hydroxyl groups must be replaced. Experiments have shown that different water replacement treatments cause differences in the subsequent behavior of the sand. Replacement of too few of the hydroxyl groups cause a failure of a blank (inhibitor free) sample to indicate zero by the test. Replacement of too much water causes the sand to be desensitized and to indicate zero inhibitor by the test even in the presence of 5 to 20 p.p.m. inhibitor. The desired hydroxyl replacement is accomplished by limiting the exposure of the sand to water to short times at less than 100° F. The preferred method is to place about 1 cc. water per 500 grams sand in the bottom of a beaker, add sand to beaker, place sand filled beaker in closed chamber, evacuate chamber to less than the vapor pressure of water to vaporize water, close chamber under produced vacuum for at least 1 hour to permit sand surface to absorb hydroxyl groups from the water vapor, and then evacuate chamber to substantially less than the vapor pressure of water to remove excess water, water vapor, and hydroxyl groups. Data supporting these preferred embodiments are shown in Table II.

TABLE II.—EFFECT OF VARIOUS TREATMENTS ON SILICA SAND ADSORBENT

| Treatment of Sand | Inhibitor Concentration: p.p.m. | |
|---|---|---|
| | Actually Used | Indicated by Test |
| None | None | 10 |
| Do | None | 8 |
| Water Washed | None | 5 |
| Do | 10 | 15 |
| Water Washed, fired 800° C. for 16 hr. | None | 10 |
| Do | None | 15 |
| Do | 15 | 25 |
| Following sands, water washed, fired 800° C. for 16 hours, cooled, then— | | |
| Laboratory atmosphere: | | |
| 1 day | None | 5 |
| 4 days | None | 10 |
| Purified humid atmosphere: | | |
| 1 day | None | 0 |
| 4 days | None | 0 |
| Wet with distilled water, dry: | | |
| 80° F. | None | 0 |
| 80° F. | 15 | 15 |
| 210° F. | 10 | 0 |
| Contacted water 7 days, 80° F. | 10 | 0 |
| Water wet, heat 24 hr.: | | |
| 219° F. | None | 0 |
| 219° F. | 10 | 1 |
| 219° F. | 40 | 15 |
| 189° F. | None | 0 |
| 188° F. | 10 | 2 |
| 150° F. | None | 0 |
| 150° F. | 10 | 3 |
| Water wet, depressurized chamber 1 hr, evacuated 2 hr | None | 0 |
| Do | 2 | 2 |
| Do | 5 | 5 |
| Do | 10 | 10 |
| Do | 15 | 15 |
| Do | 20 | 20 |

Examination of the blue oil-wet sand layer under the microscope shows that the layer is composed of discrete small spherical droplets of oil suspended in a continuous water phase. The surface of each spherical droplet of oil is substantially covered with a layer of sand grains. The individual sand grain is partially oil-wet because of the adsorption of inhibitor. The oil-wet portion of the sand grain orients itself in the oil droplet and the water-wet portion orients itself in the water phase. Thus the sand grains are present in the interface of the oil and water phases. Each oil droplet is covered with an incomplete single layer of sand and because of the sand grain orientation, the droplets do not coalesce.

In describing the foregoing embodiment of the invention the sizes, amounts, and volumes were used in an illustrative descriptive manner only, and do not limit the scope of the invention. While in the practice of the present invention illustration has been given of the use of a prepared silica adsorbent, it is contemplated that other adsorbents composed of small particles may also be used; such as clay, iron filings or powder, porcelain, iron oxide, glass microbeads, glass and the like. The adsorbent may be either preferentially oil-wet or water-wet, requiring only that the chemical for analysis reverse or alter the natural wettability. The chemical for analysis may be dissolved in either a water or oil phase and the steps of the process interchanged.

The usefulness of the present invention will be further illustrated by the following examples relating to the corrosion inhibitor squeeze technique. In this field technique, improved results can be obtained by engineering the squeeze on the basis of laboratory determined adsorptive capacity data obtained on reservoir rock core samples. A laboratory fluid flow apparatus was made by coating the cylindrical surface of a core with epoxy resin and fitting it with special flow heads attached with epoxy adhesive. Inhibitor solution at a concentration of 1000 p.p.m. was flowed through the porous sand and the effluent oil was analyzed for inhibitor content by the method of the present invention. The inhibitor concentrations in the effluent oil are shown in Table III.

TABLE III.—INHIBITOR CONTENT OF EFFLUENT OIL IN ADSORPTIVE CAPACITY TEST

| Volume of effluent, ml.: | Inhibitor concentration, p.p.m. |
|---|---|
| 1.0 | 0 |
| 2.1 | 0 |
| 3.0 | 0 |
| 4.8 | 32 |
| 5.4 | 59 |
| 5.6 | 340 |
| 6.2 | 300 |
| 6.8 | 550 |
| 7.5 | 700 |
| 8.0 | 750 |
| 9.8 | 900 |
| 12.2 | 1000 |

From the data shown in above Table III the adsorptive capacity of this particular sand was determined to be 0.0004 ml. of inhibitor per gram of sand.

The desorption characteristics of a reservoir rock sample was measured in the laboratory in a similar manner. The adsorptive capacity of the rock was first satisfied with inhibitor as described above. Inhibitor free oil was then flowed through the rock sample and effluent oil was analyzed for inhibitor content by the method of the present invention. The inhibitor in the effluent oil is provided by slow desorption from the rock surface. The inhibitor concentrations in the effluent are shown in Table IV.

TABLE IV.—INHIBITOR CONCENTRATION IN EFFLUENT OIL DESORBED FROM RESERVOIR
[Rock sample]

| Volume of effluent, pore volume: | Inhibitor concentration, p.p.m. |
|---|---|
| 1 | 1000 |
| 4 | 250 |
| 10 | 200 |
| 15 | 160 |
| 22 | 120 |
| 33 | 80 |
| 42 | 55 |
| 50 | 50 |
| 60 | 44 |
| 72 | 38 |
| 92 | 37 |
| 125 | 34 |
| 205 | 25 |
| 220 | 19 |
| 260 | 16 |
| 295 | 14 |
| 350 | 10 |
| 385 | 9 |
| 455 | 7 |
| 510 | 7 |
| 580 | 5 |
| 625 | 4 |
| 680 | 3 |
| 710 | 2 |
| 750 | 1.5 |
| 810 | 1.0 |

These laboratory desorption data illustrate the utility of the present invention as they could not previously be obtained by other methods.

A hydrocarbon producing well on the Texas Gulf Coast was squeezed with inhibitor in the usual fashion. Samples of produced fluid from this well were collected and analyzed for inhibitor content by the method of the present invention. The inhibitor content of the liquid hydrocarbon condensate produced from this well is shown in Table V.

TABLE V.—INHIBITOR CONTENT OF CONDENSATE PRODUCED FROM A TEXAS GULF PORT

| Production time after inhibitor squeeze, days: | Inhibitor concentration, p.p.m. |
|---|---|
| 0.4 | 2200 |
| 11 | 1300 |
| 2 | 660 |
| 5 | 320 |
| 6 | 250 |
| 8 | 160 |
| 13 | 130 |
| 26 | 120 |
| 40 | 90 |
| 48 | 50 |
| 54 | 45 |
| 67 | 34 |
| 81 | 24 |
| 89 | 20 |
| 103 | 13 |
| 110 | 10 |
| 138 | 9 |
| 158 | 7 |
| 180 | 5 |
| 210 | 4 |
| 240 | 3 |
| 270 | 2 |

The practice of the present invention is thus useful in the Texas Gulf Coast Field as it permits the operator of the well to determine the time an additional squeeze treatment is necessary and also in conjunction with the iron content of the produced water to determine the inhibitor concentration necessary to provide corrosion protection.

The nature and objects of the present invention having been completely described and illustrated, what I wish to claim as new and useful and secure by Letters Patent is:

1. A method for quantitatively analyzing a solution for surface active chemicals comprising; mixing said solution with two immiscible liquids and a granular adsorbent capable of adsorbing said surface active chemical, allowing granular adsorbent to separate by settling in the liquids, and determining the relative quantities of granular adsorbent containing adsorbed surface active chemical and granular adsorbent free of adsorbed surface active chemical.

2. A method as recited in claim 1 in which said immiscible fluid phases comprise water and a mineral oil.

3. A method as recited in claim 1 in which said adsorbent consists essentially of glass beads.

4. A method as recited in claim 1 in which said surface active chemical contains nitrogen.

5. A method as recited in claim 1 in which said surface active chemical contains sulfur.

6. A method as recited in claim 1 in which said adsorbent consists essentially of silica sand.

7. A method as recited in claim 6 including preparing said silica sand by the steps of water washing said silica sand, sizing said silica sand, heating said silica sand in the temperature range of 600° C. to 900° C. for at least one hour, cooling said silica sand, and treating said silica sand with a solution containing hydroxyl ions.

8. A method for quantitatively analyzing solutions for surface active corrosion inhibiting chemicals, comprising mixing in a glass vial, silica sand particles, said solution containing corrosion inhibiting chemicals, water, mineral oil, and an oil soluble colorant which is not adsorbed by the silica sand; revolving said vial around its axis to cause the components to separate into layers of water-wet sand, oil-wet sand and oil, and supernatant oil; and measuring the height of said settled water-wet sand layer, said colored oil-wet sand and oil layer, and said supernatant oil layer.

9. A method as recited in claim 8 in which said corrosion inhibiting chemical contains nitrogen.

10. A method as recited in claim 8 in which said corrosion inhibiting chemical contains sulfur.

11. A method recited in claim 8 including preparing said silica sand by the steps of water washing said silica sand, sizing said silica sand, heating said silica sand in the temperature range of 600° C. to 900° C. for at least one hour, cooling said silica sand, and treating said silica sand with a solution containing hydroxyl ions.

12. A method as recited in claim 11 comprising the steps of wetting said sand with distilled water and removing excess water by vacuum distillation at a temperature of less than 100° F. to restore said hydroxyl groups.

References Cited

UNITED STATES PATENTS

| | | | |
|---|---|---|---|
| 2,960,479 | 11/1960 | Karr et al. | 252—449 |
| 3,148,026 | 9/1964 | Roderburg | 23—182 |
| 3,202,483 | 8/1965 | McKeon et al. | 23—230 |

OTHER REFERENCES

Vleeskens, "De Rol Van OH— Gropen in Silica," Mar. 11, 1959, pp. 119–121, 23–182.

MORRIS O. WOLK, *Primary Examiner.*

JOSEPH SCOVRONEK, R. E. SERWIN, *Examiners.*